Sept. 6, 1949.  S. W. ALDERFER ET AL  2,481,060
PROCESS OF MANUFACTURING RUBBER THREAD
Filed July 30, 1947  2 Sheets-Sheet 1
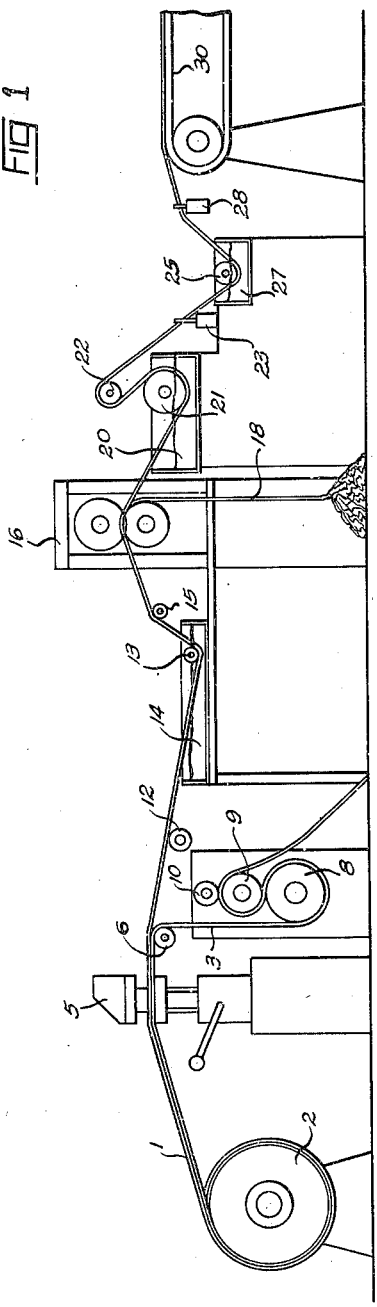
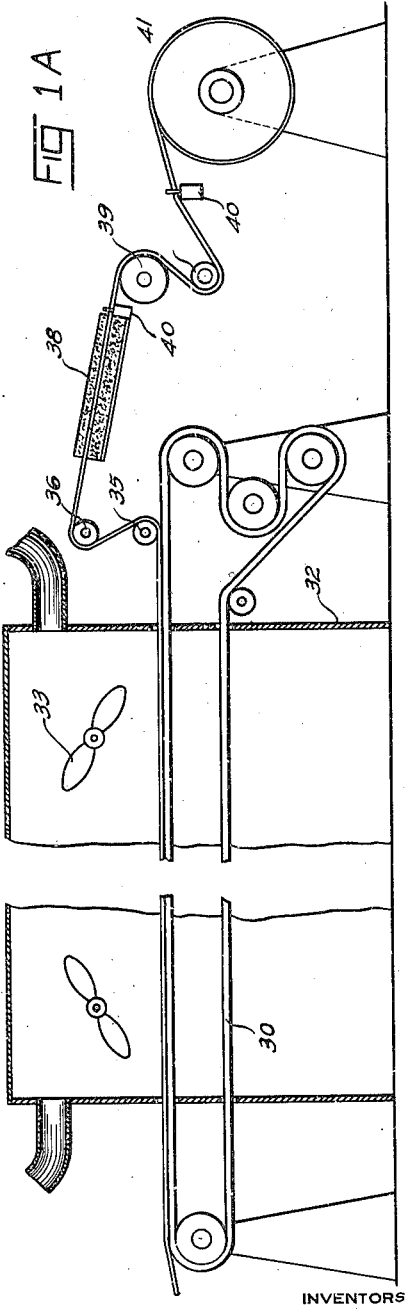
INVENTORS
STERLING W. ALDERFER
&
ALFRED BOSSHARD
BY
ATTORNEYS

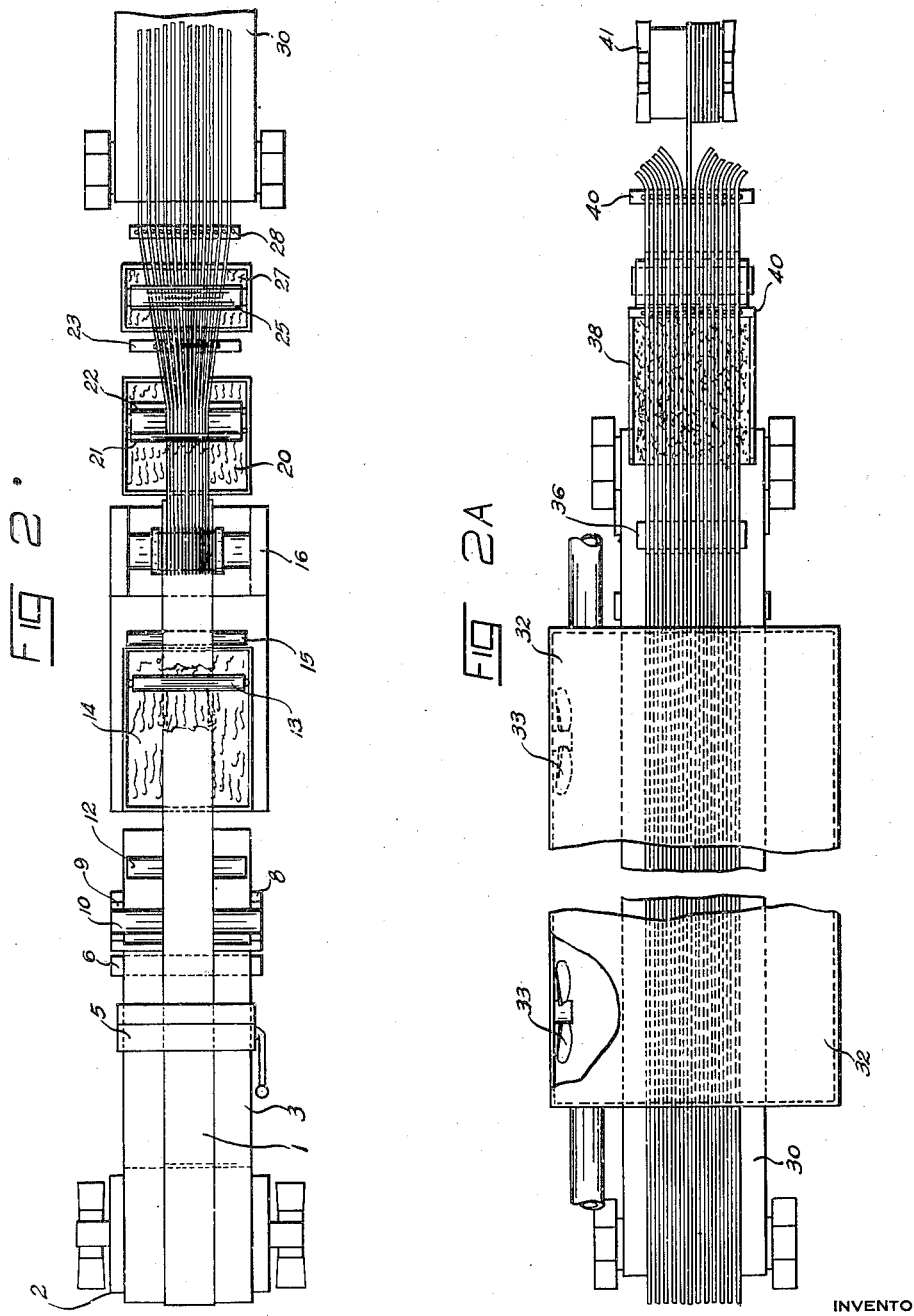

Patented Sept. 6, 1949

2,481,060

UNITED STATES PATENT OFFICE 2,481,060

PROCESS OF MANUFACTURING RUBBER THREAD

Sterling W. Alderfer and Alfred Bosshard, Akron, Ohio, assignors to Andrews-Alderfer Processing Company Incorporated, Akron, Ohio, a corporation of Ohio Application July 30, 1947, Serial No. 764,846

17 Claims. (Cl. 18—54)

The present invention relates to the manufacture of rubber thread of superior uniformity in large quantities and at much lower cost than has been possible with other processes.

The process shown and described herein is in the nature of an improvement over the process shown and described in our prior application Serial No. 730,602, filed February 24, 1947, and retains the basic improvements contained in that application. The object of the present invention is to improve still further upon that process, particularly with respect to the operations following the slitting of the rubber sheet into thread form.

One of the primary advantages of the present process is in the securing of greater uniformity in the finished thread which is obtained by the new and improved method of relaxing and curing the multiple threads after they have been stretched to reduce their cross section. In conformity with the procedure set forth in our prior application, a sheet of rubber is slit or subdivided into a plurality of threads of relatively large cross section which are then stretched to several times their original length, reducing the cross section to any desired gauge. The stretching process sets up certain strains and stresses within the rubber which should be dissipated before the threads are finally cured, this step being known in the art as relaxing the rubber. The procedure described herein fixes the threads in the stretched condition for a sufficient period to allow the internal stresses to be dissipated. In the preferred procedure the threads are further held in their fixed position while subjected to heat which vulcanizes the threads without any intermediate handling. This procedure prevents any distortion or injury of the threads while the rubber is in a very delicate condition and highly susceptible to injury or distortion. This procedure is all carried on as a part of a continuous operation so that production proceeds without interruption, the result being that it is possible to produce very fine threads of remarkable uniformity at very low cost.

As an incident to the process, the finished threads are provided with a protective coating which excludes oxygen during the vulcanizing of the thread. This coating also greatly facilitates their passage through the needles of knitting machines, thereby reducing the annoying and expensive delays which are usually encountered in the knitting of elastic fabrics, which is an advantage of considerable importance in the industry. The coating of wax or similar material which forms the protective coating also reduces the tendency of the threads to stick together in the final packages.

These and other objects are obtained without sacrificing the economical features characteristic of the process described in our previous application.

In the drawings is shown a layout of a typical installation for the production of elastic threads from previously prepared rubber sheeting. In these drawings there has been been no attempt to show the proportions of the rubber sheet or the threads in relation to the various instrumentalities which are used. The threads are very fine and are made in great numbers and it would be impractical to show the true proportions of the original sheet and the finished threads. The various machines are shown in diagrammatic form, it being possible to utilize much standard equipment in the process.

It will also be understood that the showing is of the best known and preferred form of the invention and that changes and modifications may be adopted in carrying out the steps of the process without sacrificing any of the inventive features which have been disclosed.

In the drawings:

Figs. 1 and 1A show in side elevation a typical installation for carrying out the process, Fig. 1A being a continuation of Fig. 1; and Figs. 2 and 2A are like views showing the installation in plan view.

The sheet of rubber stock from which the threads are produced is indicated at 1. It is supplied in a roll 2 in which it is wound up with a suitable liner 3 which is preferably a waxed paper over which a light, even coating of soapstone or other dusting powder is spread. The roll is wound under a considerable tension so as to avoid sagging of the liner and stock when the roll is in storage.

It is to be particularly noted that the rubber stock as it enters the cycle shown herein is uncured, wherein the present process differs from those processes of making cut rubber threads which preceded applicants' development, which is an important advantage because the trim and waste incident to the thread slitting operation may be reworked into new batches of stock without waste and at considerable improvement in the quality of the finished thread as described in our antecedent application.

It is also to be noted that the stock is preferably so compounded that at least one essential ingredient to effect vulcanization is either inert or omitted to be activated or added after the stock is converted into thread form. This is not only to permit the subsequent reworking of the scrap from the slitting operation, but also prevents premature vulcanization or partial vulcanization during the usual milling and calendering operations which are required to form the sheet 1.

As illustrative of stocks which may be employed, the following examples are given, these being examples only, as many modifications and variations thereof will be suggested to one skilled in the art of rubber compounding:

|  | A | B |
|---|---|---|
| Rubber | 100 | 100 |
| GR-S 50 | 5 | 5 |
| Antioxidant | 1 | 1 |
| Softener if desired | 2 | 2 |
| Zinc sulfide | 5 to 20 | 5 to 20 |
| Zinc oxide | 2 to 5 | 2 to 5 |
| D. P. G. (Diphenyl guanidine) | .4 | .4 |
| Sulfur | none | 2.0 |
| Tetrone A | 1.25 to 2½ | none |
| Zenite A | none | .5 |

Tetrone A—Dipentamethylene-thiuram-tetrasulfide.
Zenite A—97% Zn salt of mercaptobenzothiazole; 3% tetramethyl-thiuram-monosulfide.

Tetrone A is a sulfur bearing accelerator containing sufficient sulfur to effect vulcanization during the final step of the process, but the sulfur is held inactive or imprisoned within the Tetrone A until the stock is given the final treatment during the latter steps of the process. The sulfur is, therefore, inert in formulation A above and this particular adaptation of the process is, in effect, adding the sulfur to the stock during the final steps of the process.

In formulation B above, the necessary vulcanizing ingredients are present, but the cure is sluggish and can be speeded up so as to be completed in the requisite time period by treating the stock with an accelerator at a later step in the process.

In either A or B formulation, a small amount of any standard cure retarder may be used as a safety factor to prevent the premature setting up of the stock. Salicylic acid is one of the materials which may be used for this purpose.

The stock, whether of the formulation A or B or the equivalent thereof, is milled and should be stored a few days for aging before being warmed up for calendering. The calendering of the stock to produce the sheet 1 may be in any conventional manner and may be done so as to secure a single or two ply sheet, the latter being preferred so as better to avoid the presence of thick and thin spots on the final sheet. It is preferable to allow an aging period after the sheet is made so that it will regain its "nerve," it being noted that the tight winding of the sheet in the roll 2 prevents distortion of the sheet during this period.

The thickness or gauge of the sheet 1 is determined by the size of the finished thread and by the degree of stretch which is to be imparted to the threads after they are cut from the sheet. While dimensions are not essential and a wide latitude may be employed, by way of example, if the final product is to be a thread .016 inch in thickness, the sheet may be run at .025" gauge and the threads are cut to .025" which, with a two times elongation will produce a finished thread square in cross section and very closely approximating the desired final gauge.

From the roll 2, the sheet 1 with its liner 3 passes through a conventional splicing machine indicated by the numeral 5. This is provided so that the end of one sheet may be butt-spliced to the end of the next sheet so that the threads may be formed in continuous lengths.

From the splicing unit the sheet passes over a roll 6 where the liner is separated from the sheet 1 and passes through a bank of drawing rolls 8, 9 and 10, one or more of these rolls being driven so as to propel the sheet up to this point. As the sheet 1 is propelled by the liner, there is no stretching of the sheet and it retains its original thickness.

After the sheet 1 passes over roll 6, it is led over a supporting roll 12 and thence under a roll 13 which is submerged in a bath 14. The bath 14 is for the purpose of facilitating the cutting of the sheet into the individual threads. The bath is preferably a soap solution which wets both sides of the stock so that the threads may be drawn through the slitting knives without the use of plows or other means for stripping the freshly cut threads from the faces of the knives. There are a number of soap solutions which may be employed for this purpose and are well known in the art.

The stretching and orientation are greatly improved if the stock is warmed before it is cut into thread form. The warming of the unvulcanized stock while in sheet form removes some of the stresses which would otherwise be present in the threads at the time they are stretched and makes it possible to elongate and attenuate the threads to greater degrees than possible without this preliminary heat treatment. These beneficial results are attained in the specific method described by utilizing the soap solution as the warming medium, although the warming of the stock to relax the sheet rubber is not necessarily confined to this point in the process so long as it is done before the sheet is cut into thread form.

From the bath 14 the sheet, now at the proper temperature and with a coating of lubricant over its surfaces, is led over a roll 15 directly to the cutting knives which slit the sheet into the multiplicity of threads. A form of cutting knife assembly is indicated at 16. Apparatus for this purpose which comprise two sets of overlapping disk-like knives are well known in the art, and while any type knife of this general design may be employed, it is preferred to use the specific arrangement shown in the copending application of the applicant Bosshard, Serial No. 737,060, filed March 25, 1947.

There is no attempt in Fig. 2 to indicate the number of threads which will be cut at a single pass through the slitting machine. There will always be a substantial amount of trim at both edges of the stock and this trim is permitted to drop at this point and collects as shown at 18 in Fig. 1. As the rubber is not cured or set up at this point, the trim instead of being a waste product, as in the usual processes, may be reworked in other batches without loss and to the improvement of the product.

From the cutting unit 16 the stock, now reduced to multiple thread form, passes into a second bath 20 beneath roll 21 and over roll 22, through a comb 23 and under a roller 25 submerged in a third bath 27, through comb 28 and onto the curing belt 30.

The roll 21 is driven at a speed in excess of the speed at which the stock is delivered to the cutting knives to impart the requisite elongation and attenuation to the several threads to bring them to their final cross section. The increment in lineal speed between the cutting knives and the roll 21 draws the cut threads out of the knives and also reduces the cross section of each thread so that the action at the bath 20 is more effective.

The combs serve to spread the threads apart during the subsequent operations.

The bath 20 is for the purpose of supplying the missing vulcanizing ingredient or to activate or accelerate the vulcanizing ingredient so that in the subsequent drying and heating the final cure will take place. In this connection it is advisable to incorporate in the bath 20 a water soluble accelerator which will react with the ingredients in the stock to permit a cure of the stock in a short time at a relatively low temperature.

A water soluble accelerator which may be employed is that known in the art as "pip pip" (piperidinium pentamethylenedithiocarbamate). This is used in a dilute solution of about 5 parts of "pip pip" to 95 parts of water. The "pip pip" acts in conjunction with the Tetrone A or Zenite A in stocks A or B, respectively, so that the cure is materially accelerated. Any other type of accelerator may be used in the bath 20, dependent on the formulations used in the original stocks.

It may be desirable to employ other accelerators in conjunction with the "pip pip." For example, the bath 20 may consist of 5 parts of "pip pip," 1 part of dibutyl-ammonium oleate in 94 parts of water, or an equivalent amount of butylzimate dispersion may be used in place of the dibutyl-ammonium oleate. These materials used as auxilary to the pip pip have the joint effect of reducing surface tack on the thread and aid in adjusting the pH value of the bath to secure a better penetration of the accelerators into the rubber. In this connection it will be observed that the attenuation of the threads in the bath also facilitates the penetration of the accelerators.

The bath 27 is a wax solution, and may be employed at this stage of the process to adhere the threads to the belt 30 and also to provide the abrasive resisting film over the threads, to which reference has been made above. The wax which is used may be of any of the natural or artificial waxes or mixtures thereof which may be dispersed in the water bath. A suitable wax solution has been found to be one containing a mixture of waxes in which carnauba wax is largely predominant. One of the requisites of the wax solution is that it shall not have a melting point so low that it will not adhere the threads to the belt while passing through the curing oven.

It is desirable to use some additional accelerator at this point and it has been found that a bath composed of 50% of a wax solution and 50% of a 5% solution of "pip-pip" in water will give the desired results.

The threads, now stretched to their final cross section, pass on to the belt 30 to which they adhere by the wax coating applied at the bath 27.

As a substitute for the wax bath 27 any suitable agglutinant may be incorporated in the bath 20 and the separate bath of wax may be omitted if such refinement of the process is found to be desirable.

The belt 30 is of any desired length, the requisites being that the threads are given a sufficient interval so that the residual internal stresses in the rubber are first relaxed and then that the threads are adequately cured. The belt 30 after a sufficient interval enters a long heating chamber 32 in which fans 33 keep the air in constant circulation.

There is no intention to place any limitations on the extent of the curing oven or the speed of the belt or the time during which the rubber remains in the heated atmosphere of the oven as these are all factors which may be readily determined by one skilled in this art. The best results are obtained by the use of relatively low temperatures as compared with conventional pressure type cures. It has been found that temperatures of 240° F. for twenty to thirty minutes and slightly higher may be used. However, still higher temperatures may be used in which case it may be advisable to employ inert gases in the chamber 32 which would reduce the danger of oxidation. It is desirable to have the thread as it issues from the chamber at slightly on the underside of optimum cure as stocks of the type described are known as low temperature curing stocks which tend to continue curing after removal from the curing oven. It is thus important that accelerators be used which provide superior aging qualities and give long, flat curing curves. The stocks specified herein are of this type.

One of the primary purposes of the agglutinant is to adhere the delicate threads to the surface of the belt 30. This anchors the threads firmly from the time they first contact the belt until they are stripped therefrom at the end of the vulcanizing operation. The relaxing of the stresses within the stretched threads will often cause the threads to shrink or curl, but by adhering the threads to the surface of the belt, they are compelled to remain in this stretched condition during this period. Also there is no tendency for the threads to shrink or shift during the subsequent period of curing. Were it not for the adhesion of the threads to the surface of the belt, they might develop thin spots or break during the period while they are on the belt, or they might curl or shift about and become adhered to one another. This feature of anchoring the threads during the entire period from the time of their final stretch until the curing is completed has made it possible to produce threads of remarkable uniformity and has also reduced losses in this stage of the process to a very low minimum.

A further important function of the protective coating about the threads is to protect the rubber in the delicate filaments from oxidation while in the heated atmosphere of the curing oven.

After the belt leaves the oven 32, the cured threads are stripped from the surface of the belt by the stripping rolls 35 and 36, pass through a soapstoning box 38, and on to the final packaging stage. At intervals, combs 40 are used to guide the threads. A typical spool is shown at 41.

It will be seen that the stated objects of the invention have been achieved in a simple and practical manner. The manufacture of a great number of very uniform elastic threads at very low operating costs is an important advance in this art. A very detailed description of the process has been given, but it will be understood that the details are not important and that variations and modifications may be adopted and used within the scope of the invention as set forth in the appended claims. While it is preferred to employ a belt as a support of fixed dimensions to which the stretched thread is affixed during the period that the internal stresses are relieved and then on which the thread is cured, any suitable substitute may be employed therefor.

What is claimed is:

1. The process of making rubber threads comprising compounding a rubber stock with inert vulcanizing ingredients, sheeting the rubber stock to a predetermined gauge, slitting the sheet thus formed into a multiplicity of threads, stretching the threads to reduce their cross section, activating the vulcanizing ingredients, coating the threads with an adhesive film, adhering the threads to a surface, retaining the threads on the surface until stresses imparted by the stretching operation are relieved, and then curing the relaxed threads without removing them from the support.

2. The process of making rubber threads comprising compounding a rubber stock with inert vulcanizing ingredients, sheeting the stock to a predetermined gauge, slitting the sheet thus formed into a multiplicity of threads, stretching the threads to attenuate them, activating the vulcanizing ingredients, adhering the threads to a moving surface and without releasing the threads from the surface first relieving the stresses in the threads created by the stretching operation and then subjecting the threads to heat to vulcanize the rubber while they are adhered to the surface.

3. The process of making a plurality of rubber threads from a sheet of rubber in a continuous operation consisting of slitting the sheet in a multiplicity of threads, stretching the threads uniformly, adhering the stretched threads to a moving surface, and before releasing the threads from the surface relieving the stresses caused by the stretching operation, and then subjecting the threads to a curing temperature without detaching the threads from the surface.

4. The process of making a plurality of rubber threads from a sheet of rubber in a continuous operation consisting in slitting the sheet into a multiplicity of threads, stretching the threads, adhering the stretched threads to a moving surface and while said threads are affixed to the surface subjecting them to heat to first relieve the stresses in the rubber caused by the stretching operation and then to vulcanize the rubber.

5. The process of making rubber thread consisting in forming a thread from an uncured rubber stock, stretching the thread to reduce its cross section, adhering the stretched thread to a moving surface, and while the thread is affixed to the surface, performing the operations of first relieving the internal stresses created in the rubber by the stretching operation, and then curing the rubber.

6. The process of making rubber thread comprising the steps of forming a thread from an uncured rubber stock, stretching the thread to reduce its cross section, coating the thread with an adhesive, passing the thread on to a moving surface to which it is affixed by the adhesive, and without releasing the thread from the surface, first relieving the internal stresses created in the rubber by the stretching operation, and then curing the rubber while the thread is still affixed to the surface.

7. The process of making rubber thread comprising the steps of forming a thread from an uncured rubber stock containing inert vulcanizing ingredients, stretching the thread to reduce its cross section and while the thread is in attenuated condition, passing the thread through a bath containing an activator for the vulcanizing ingredients and then through a bath containing an adhesive, affixing the thread to a moving surface and without releasing the thread from the surface, performing the operations of first relieving the stresses created in the rubber by the stretching operation and then curing the rubber.

8. The process of making rubber thread comprising the steps of forming a thread from an uncured rubber stock containing inert vulcanizing ingredients, stretching the thread to reduce its cross section and while the thread is in attenuated condition, passing the thread through a bath containing an activator for the vulcanizing ingredients and then through a bath containing a wax component which will affix the thread to a moving surface during the subsequent operations, affixing the thread to a moving surface and without releasing the thread from the surface during the succeeding operations recited, first relieving the stresses created in the rubber by the stretching operation and then curing the rubber.

9. In the process of making a fine rubber thread from a larger thread of uncured rubber by stretching the larger thread to reduce its cross section, the steps of applying an adhesive to the thread and adhering the attenuated thread to a surface of fixed dimensions and retaining the thread affixed to the surface, until stresses within the rubber caused by the stretching operation are relieved, and then curing the thread while the thread is still affixed to the surface.

10. In the process of making a fine rubber thread from a larger thread of uncured rubber by stretching the larger thread to reduce its cross section, the steps of applying an oxygen-excluding coating to the thread and adhering the attenuated thread to a surface of fixed dimensions and while the thread is affixed to the surface, performing the operations of relieving the stresses within the rubber caused by the stretching operation, and then curing the thread.

11. In the process of making a fine rubber thread from a larger thread of uncured rubber by stretching the larger thread to reduce its cross section, the steps of adhering the attenuated thread to a moving surface of fixed dimensions and without releasing the thread from the surface, performing the operations of first relieving the stresses within the rubber caused by the stretching operation and then subjecting the thread to heat sufficient to vulcanize the rubber.

12. In the process of making a fine rubber thread in a continuous operation from a larger thread of uncured rubber, the steps of stretching the larger thread to reduce its cross section and while the thread is attenuated, adhering it to a moving belt and without releasing the thread from the belt first relieving the stresses within the rubber caused by the stretching operation and then subjecting the thread to heat for a sufficient time to vulcanize the rubber while the thread is still adhered to the belt.

13. A process of making cut rubber threads comprising forming a sheet of unvulcanized rubber stock, warming the stock while in sheet form to relax the rubber and remove some of the internal stresses therefrom, slitting the sheet into thread form, elongating the threads to impart a permanent attenuation thereto, holding the threads from shifting and while so held again heating the threads, first to remove residual stresses from the rubber and then to vulcanize the threads.

14. A process of making cut rubber threads comprising forming a sheet of unvulcanized rubber stock, warming the stock while in sheet form to relax the rubber and remove some of the internal stresses therefrom, slitting the sheet into thread form, elongating the threads to impart a permanent attenuation thereto, attaching the threads to a moving surface and while the threads are so attached relaxing them to remove residual stresses from the rubber and vulcanizing the threads while the threads are still attached to the moving surface.

15. The process of making rubber threads comprising compounding a rubber stock, forming the stock into a sheet of unvulcanized rubber of a predetermined gauge, slitting a portion of the unvulcanized sheet into a multiplicity of threads, stretching the threads to reduce them to their finished size, attaching the stretched threads to a surface of fixed dimensions and heating the threads while so attached to vulcanizing temperature.

16. The process of making rubber threads comprising compounding a rubber stock, forming the stock into a sheet of unvulcanized rubber of a predetermined gauge, slitting a portion of the unvulcanized sheet into a multiplicity of threads, stretching the threads to reduce them to their finished size, attaching the stretched threads to a surface of fixed dimensions and heating the threads while so attached to vulcanizing temperature, the remainder of the sheet after slitting being reworked in its unvulcanized state.

17. A process for making cut rubber threads comprising the steps of compounding a rubber stock, calendering the stock into a sheet of unvulcanized rubber of a predetermined gauge, slitting the sheet into a plurality of threads, stretching the threads as they are formed by the slitting operation to reduce them to their finished size, attaching the threads to a moving belt, retaining the threads attached to the belt until residual stresses imparted by the stretching operation are relieved and without detaching the threads from the belt subjecting them to heat to vulcanize them in their attenuated and relaxed condition.

STERLING W. ALDERFER.
ALFRED BOSSHARD.

REFERENCES CITED

The following references are of record in the file of this patent:

UNITED STATES PATENTS

| Number | Name | Date |
|---|---|---|
| 1,976,343 | Joss | Oct. 9, 1934 |
| 2,003,721 | Pestalozza | June 4, 1935 |
| 2,052,361 | Pestalozza | Aug. 25, 1936 |
| 2,297,585 | Shepherd | Sept. 29, 1942 |

Certificate of Correction

Patent No. 2,481,060                                            September 6, 1949

STERLING W. ALDERFER ET AL.

It is hereby certified that error appears in the printed specification of the above numbered patent requiring correction as follows:

Column 7, line 16, for the word "relieving" read *relaxing*;

and that the said Letters Patent should be read with this correction therein that the same may conform to the record of the case in the Patent Office.

Signed and sealed this 24th day of January, A. D. 1950.

[SEAL]

THOMAS F. MURPHY,
*Assistant Commissioner of Patents.*